United States Patent [19]
Lee

[11] Patent Number: 5,887,055
[45] Date of Patent: Mar. 23, 1999

[54] SUBSCRIBER INFORMATION SHIFTING TECHNIQUE FOR A PRIVATE EXCHANGE

[75] Inventor: Sung-Chan Lee, Kyungki-do, Rep. of Korea

[73] Assignee: SamSung Electronics Co., Ltd., Suwon, Rep. of Korea

[21] Appl. No.: 755,746

[22] Filed: Nov. 22, 1996

[30] Foreign Application Priority Data

Nov. 24, 1995 [KR] Rep. of Korea ............... 1995/43534

[51] Int. Cl.⁶ ..................................... H04M 3/42
[52] U.S. Cl. ..................... 379/201; 379/201; 379/210
[58] Field of Search ............................. 379/201, 210, 379/211, 216, 242

[56] References Cited

U.S. PATENT DOCUMENTS

| | | | |
|---|---|---|---|
| 4,755,985 | 7/1988 | Jayapalan et al. | 379/245 |
| 4,956,861 | 9/1990 | Kondo | 379/211 |
| 5,136,585 | 8/1992 | Nizamuddin et al. | 379/201 |
| 5,251,248 | 10/1993 | Tokunaga et al. | 379/220 |
| 5,392,340 | 2/1995 | Otsuka | 379/201 |
| 5,392,346 | 2/1995 | Hassler et al. | 379/201 |
| 5,410,591 | 4/1995 | Takahashi | 379/201 |
| 5,469,501 | 11/1995 | Otsuka | 379/201 |
| 5,541,992 | 7/1996 | Tsuzuki et al. | 379/233 |

FOREIGN PATENT DOCUMENTS

WO 88/02205 A1  3/1988  WIPO.

*Primary Examiner*—Krista Zele
*Assistant Examiner*—Benny Q. Tieu
*Attorney, Agent, or Firm*—Robert E. Bushnell, Esq.

[57] ABSTRACT

In order to shift a subscriber's extension telephone from one port to another in a private exchange having a subscriber information shifting button on each extension telephone, a subscriber information shifting technique includes: determining whether the telephone moved to another port is off-hook, generating a dial tone and sensing the operation of the subscriber information shifting button on the telephone; determining whether a subscriber class is authorized to modify exchange programming when the operation of the subscriber information shifting button has been sensed; generating a switchover tone and sensing a subscriber's extension number and identification number when the subscriber class is authorised, determining whether there is an extension number for the another port after sensing the subscriber's extension number and identification number, determining whether the identification number is valid when there is an extension number; changing the subscriber information when the identification number is right, and generating a confirming tone and sensing an on-hook condition after changing the subscriber information.

7 Claims, 3 Drawing Sheets

SUBSCRIBER INFORMATION SHIFTING TECHNIQUE FOR A PRIVATE EXCHANGE

CLAIM FOR PRIORITY

This application make reference to, incorporates the same herein, and claims all benefits accruing under 35 U.S.C. §119 from an application entitled SUBSCRIBER INFORMATION SHIFTING METHOD IN PRIVATE EXCHANGE earlier filed in the Korean Industrial Property Office on the 24th day of Nov. 1995 and there assigned Ser. No. 43534/1995.

BACKGROUND OF THE INVENTION

1. Field of the Invention

This invention relates to techniques for shifting subscriber information in a private exchange, and more specifically, to processes and circuits for maintaining subscribers' telephone numbers and grades or classes previously used even when any subscriber's telephone changes through alterations in the arrangement or line in a central office.

2. Description of the Related Art

A key telephone system or private exchange includes different subscriber numbers and grades or classes, so that different people can use one telephone number together. The grade or class refers to whether a subscriber is given the authority to just call others in the same office or to make local calls or to make long distance calls, or to modify the programming of the telephone system, etc. Such key telephone and private exchange systems are generally used in offices. Due to changes in the arrangement and lines in the office, the location of a telephone having a subscriber number and class may be changed. When the location of the telephone is changed, a new subscriber number and class must be provided. This involves a problem in that much time and expense are required.

Early efforts in the art, represented by the Method And Apparatus For Addressee Location patent issued to Kondo, U.S. Pat. No. 4,955,861, endeavors to provide a telephone exchange enabling a subscriber to notify the exchange of a telephone extension at the subscriber's present location so that calls directed to the extension will be directed to the telephone at the subscriber's present location. More contemporary practice in the art is represented by two patents to Otsuka, U.S. Pat. Nos. 5,392,340 and 5,469,501, entitled Telephone Exchange Apparatus and Communication Exchange Apparatus With Switching Of Communication Terminal Information, both disclose an arrangement for a telephone exchange in which the attributes of a subscriber may be changed from one extension number to another.

Other efforts in the art are represented by U.S. Pat. No. 5,392,346 issued to Hassler, et al., and entitled Mobile Log-In Capability Featuring Fixed Physical (Terminal-Dependent) Translations And Portable Logical (User-Dependent) Translations; U.S. Pat. No. 5,251,248 issued to Tokunaga, et al., and entitled Telephone Network Having Personal Number For Position-Independent; and U.S. Pat. No. 4,755,985 issued to Jayapalan, et al., and entitled Method And Apparatus For Facilitating Moves And Changes In A Communication System. I have found that contemporary practice in the art fail to effectively assure a shift of information for a subscriber in order to maintain the subscriber's previously used telephone number and grade when the site of installation of the subscriber's telephone is changed.

SUMMARY OF THE INVENTION

Accordingly, it is an object of the present invention is to provide an improved telecommunication exchange.

It is another object to provide a process and circuit for shifting information for a subscriber in order to maintain the subscriber's previously used telephone number and class when the site of installation of the subscriber's telephone is changed.

It is still another object to provide a process and circuit for maintaining a subscriber's current telephone number and customer status whenever changes occur in the arrangement and telephone lines in a central office.

These and other objects may be attained with a circuit and process of maintaining information for subscribers by shifting a subscriber's extension telephone from one port to another in a private exchange. A determination is made as to whether or not a telephone that has been moved to another port is off-hook; a dial tone is generated and the operation of a subscriber information shifting button on the telephone is sensed when the telephone is off-hook; a determination is then made about whether a subscriber's class is authorized to modify exchange programing when the operation of the subscriber information shifting button has been sensed; a switchover tone is generated, and the subscriber's extension number and identification number is sensed when the subscriber class is authorized. A determination is then made as to whether or not there is an extension number for the another port assigned to the subscriber after the subscriber's extension number and identification number has been sensed; a determination is made as to whether the identification number is valid when there is an extension number; and the subscriber's information is changed when the identification number is valid. A confirmation tone is generated and then sensing that the subscriber's telephone is on-hook after the subscriber's information has been shifted.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
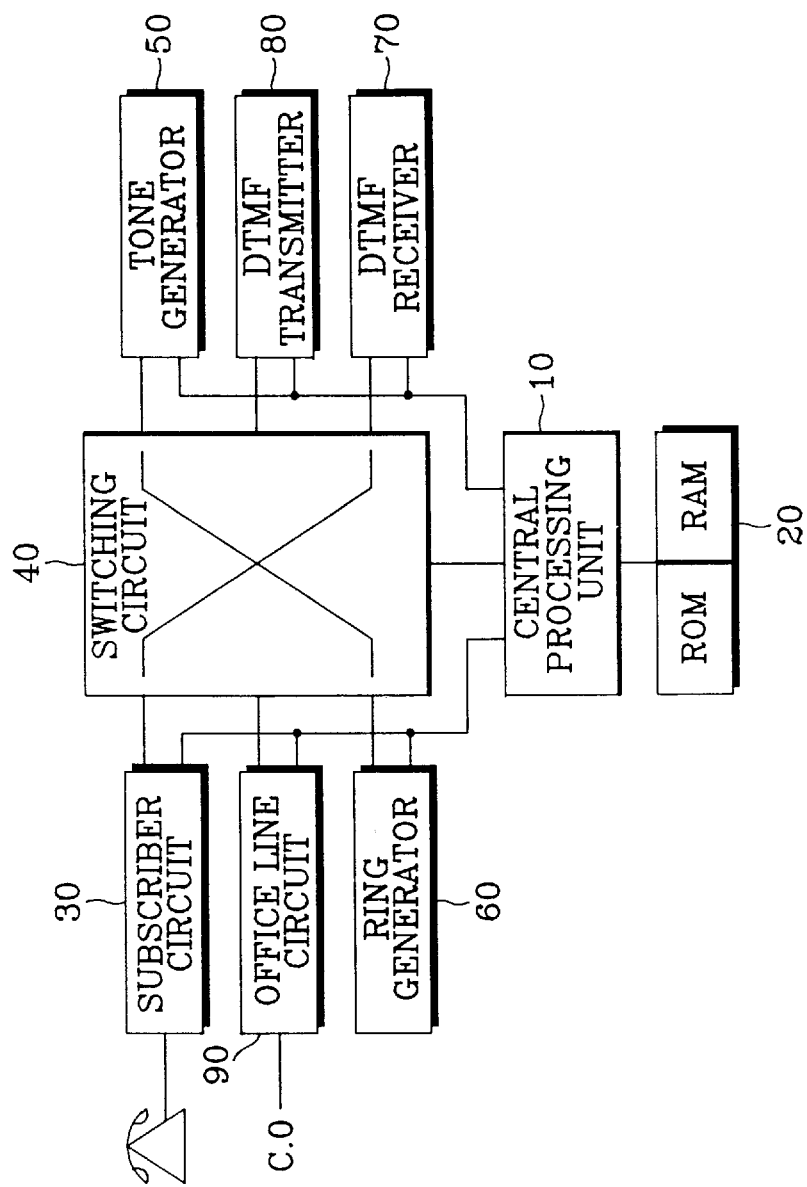
FIG. 1 is a block diagram of a private exchange accommodating the practice of the present invention.

Turning now to the drawings and referring to FIG. 1, a central processing unit (CPU) 10 controls the overall operation which is required for subscriber shifting, through an access of a subscriber shifting program. A memory unit 20 includes a read-only memory (ROM) for storing the subscriber shifting program and initial service data, and a random-access memory (RAM) which has the subscriber shifting program and volatile data processing space, and is used as working memory of the CPU 10. A subscriber circuit 30 interfaces with the subscriber's telephone and equipment. A switching circuit 40 switches various tone and speech data under the control of the CPU 10. A tone generator 50 generates various tones, and then feeds them to the switching circuit 40, which responds to the control of the CPU 10. A ring generator 60 supplies a ringing signal of a square waveform to the switching circuit 40 under the control of the CPU 10. A dual tone multi-frequency (DTMF) receiver 70 analyzes a multi-frequency code (MFC) generated by the subscriber in the subscriber circuit 30, and then supplies relevant digital data to the CPU 10. A DTMF transmitter 80 outputs an MFC signal under the control of the CPU 10. An office line circuit 90, forms an office loop by seizing an office line (C.O.), and interfaces the incoming signal from the office line under the control of the CPU 10.

Figure 2A:
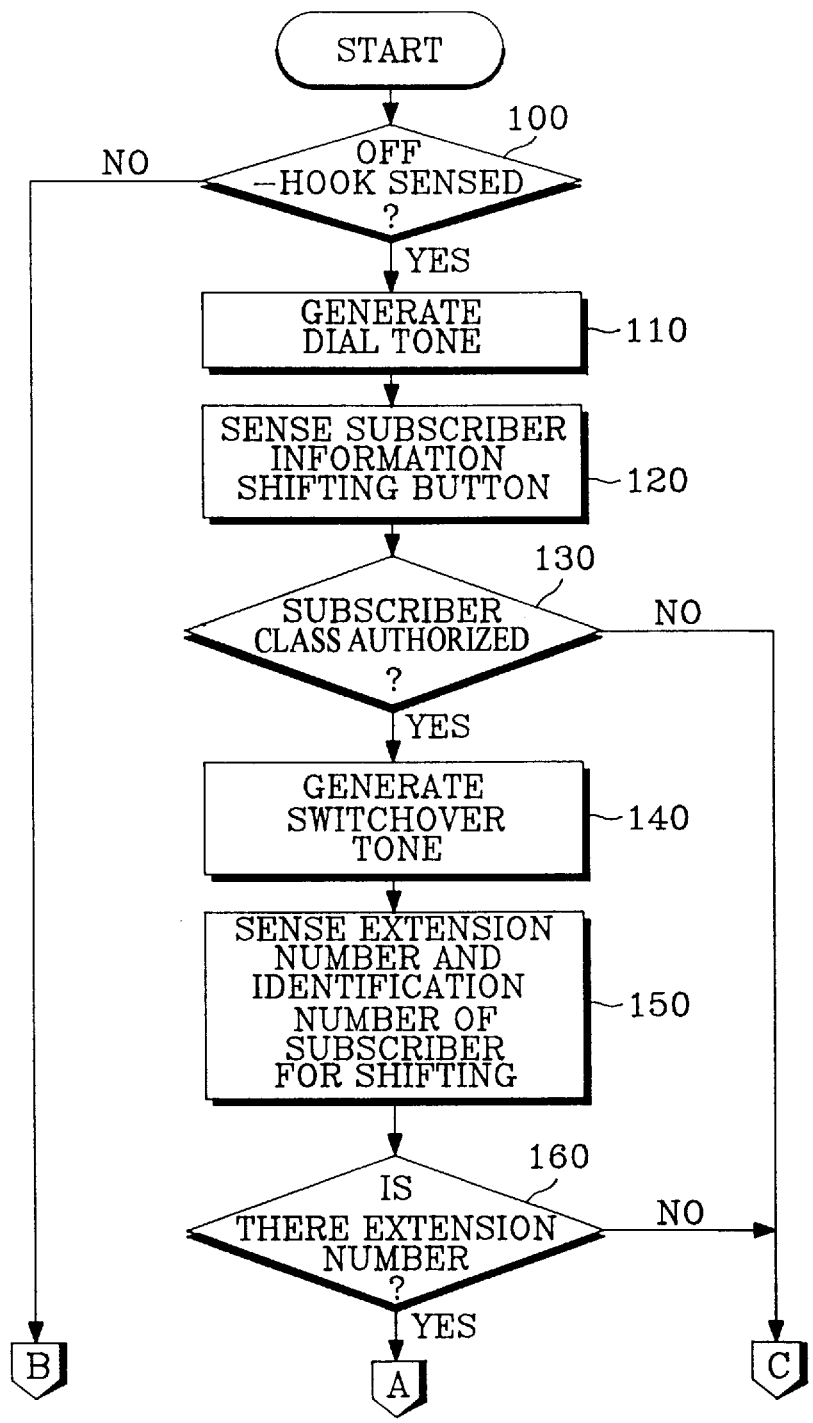
FIGS. 2A and 2B together form a flowchart illustrating a technique for shifting information about a subscriber in the private exchange according to the principles of the present invention.
Figure 2B:
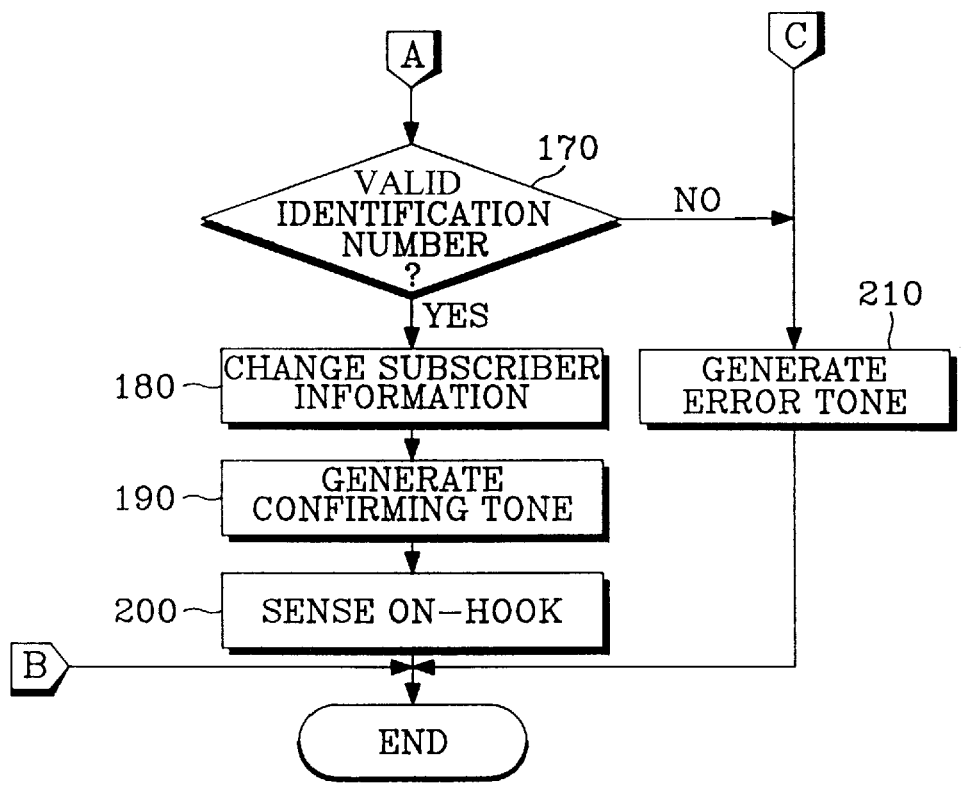

FIGS. 2A and 2B together form a flowchart illustrating a subscriber information shifting technique for using the subscriber number and class as they were before a telephone is moved to be connected to another port in a private exchange of FIG. 1, when a telephone connected to a certain port is moved so as to be connected to another port.

First, the subscriber number and class of the telephone connected to the port 1 is assumed to be used by the subscriber even after the telephone connected so as to the port 1 is shifted to be connected to the port 2. As shown in FIGS. 2A and 2B, a determination is made as to whether the receiver of the telephone connected to the port 2 is off-hook at step 100. If the receiver is off-hook, the program proceeds to step 100. If the receiver is not off-hook, the program ends. At step 110, the CPU 10 controls the tone generator 50 so as to generate and supply a dial tone to the receiver. If the operation of a subscriber information shifting button of the telephone connected to the port 2 is sensed at step 120, the program proceeds to step 130. At step 130, the CPU 10 determines whether the class of the subscriber originally using the port 1 is authorized to modify exchange programming, after examining a subscriber information table stored in the RAM of the memory unit 20. If the class of the subscriber is authorized, the program proceeds to step 140. If the class of the subscriber is not authorized, the program proceeds to step 210. At step 140, the CPU 10 controls the tone generator 50 so as to generate a switchover tone through the telephone. At step 150, the CPU 10 senses the extension number and identification number of the subscriber for shifting, after examining the subscriber information table. In other words, the subscriber's extension number and identification number of the telephone connected the port 2 are sensed. At step 160, a determination is made as to whether there is an extension number in the port 2. If there is an extension number, step 170 follows. If not, then step 210 follows. At step 170, a determination is made as to whether or not the identification number of the port 2 is valid. If the identification number is valid, step 180 follows. Otherwise, step 210 follows. At step 180, the subscriber's extension number of the telephone originally connected to the port 1 is shifted to port 2, with the subscriber's identification number being shifted. At step 190, the CPU 10 controls the tone generator 50 so as to output a confirming tone to the telephone receiver indicating that the subscriber information has been changed. If the on-hook condition of the telephone receiver is sensed at step 200, then the program ends. Alternatively, at the step 210, an error tone is generated, and the program ends.

As described above, since the present invention provides a technique for constantly using the subscriber's telephone number and class previously used even when the location of the subscriber's telephone is changed through changes of arrangement and line in an office, it is not necessary to reissue a subscriber number and class to the telephone whose placement has changed, thereby economizing on cost and time.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A subscriber information shifting method for shifting a subscriber's extension telephone from one port to another port in a private exchange, the method comprising the steps of:

determining whether a telephone moved to another port is off-hook;

generating a dial tone and sensing an operation of a subscriber information shifting button on the telephone upon a determination that the telephone is off-hook;

determining whether a subscriber class is authorized to modify exchange programming upon a determination that the operation of the subscriber information shifting button has been sensed;

generating a switchover tone and sensing a subscriber's extension number and identification number upon a determination that the subscriber class is authorized;

determining whether there is an extension number for the another port after sensing the subscriber's extension number and identification number;

determining whether the identification number is valid upon a determination that there is an extension number for the another port;

changing the subscriber information upon a determination that the identification number is valid; and generating a confirming tone and sensing that the telephone is on-hook after changing the subscriber information.

2. The method according to claim 1, further comprising the steps of:

generating an error tone upon a determination that the subscriber class is not authorized;

generating the error tone upon a determination that there is no extension number for another port; and generating the error tone upon a determination that the identification number is invalid.

3. The method according to claim 1, the step of changing the subscriber information includes transferring the number of a previous port to the number of present port, and transferring the subscriber's extension number and class number of the previous port to those of the present port.

4. A subscriber information shifting apparatus for shifting a subscriber's extension telephone from one port to another port in a private exchange, the apparatus comprising:

means for determining whether a telephone moved to another port is off-hook;

means for generating a dial tone and sensing an operation of a subscriber information shifting button on the telephone upon a determination that the telephone is off-hook;

means for determining whether a subscriber class is authorized to modify exchange programming upon a determination that the operation of the subscriber information shifting button has been sensed;

means for generating a switchover tone and sensing a subscriber's extension number and identification number upon a determination that the subscriber class is authorized;

means for determining whether there is an extension number for the another port after sensing the subscriber's extension number and identification number;

means for determining whether the identification number is valid upon a determination that there is an extension number for the another port;

means for changing the subscriber information upon a determination that the identification number is valid; and means for generating a confirming tone and sensing that the telephone is on-hook after changing the subscriber information.

5. The apparatus according to claim 4, further comprising an error tone generator for:

generating an error tone upon a determination that the subscriber class is not authorized;

generating the error tone upon a determination that there is no extension number for the another port; and generating the error tone upon a determination that the identification number is invalid.

6. The apparatus according to claim 4, the means for changing the subscriber information including a means for transferring the number of a previous port to the number of present port, and a means for transferring the subscriber's extension number and class number of the previous port to those of the present port.

7. A subscriber information shifting apparatus for shifting a subscriber's extension telephone from one port to another port in a private exchange, the apparatus comprising:

a central processing unit controlling the apparatus;

a memory connected to said central processing unit and including a read-only memory storing a subscriber shifting program and initial service data and including a random access memory having subscriber shifting program and volatile data process space, said random access memory being used as a working memory of said central processing unit;

a subscriber circuit connected to said central processing unit for interfacing with the subscriber's telephone and equipment;

a switching circuit connected to said central processing unit, switching tone and speech data under the control of the central processing unit;

a tone generator connected to said switching circuit, generating various tones under the control of the central processing unit;

a ring generator connected to said subscriber circuit and generating a ringing signal under the control of said central processing unit;

a dual tone multifrequency receiver connected to said switching circuit, analyzing multifrequency code generated by the subscriber in the subscriber circuit and for supplying corresponding digital data to said central processing unit;

a dual tone multifrequency transmitter connected to said switching circuit, transmitting multifrequency code under the control of said central processing unit; and an office line circuit connected between an office line and said switching circuit, forming an office loop by seizing the office line and interfacing an incoming signal from said office line under the control of the central processing unit;

wherein:

said subscriber circuit determines whether a telephone moved to another port is off-hook;

said tone generator generates a dial tone and said central processing unit senses an operation of a subscriber information shifting button on the telephone via the dual tone multifrequency receiver upon a determination that the telephone is off-hook;

said central processing unit determines whether a subscriber class is authorized to modify exchange programming upon a determination that the operation of the subscriber information shifting button has been sensed;

said tone generator generates a switchover tone and said central processing unit senses a subscriber's extension number and identification number upon a determination that the subscriber class is authorized;

said central processing unit determines whether there is an extension number for the another port after sensing the subscriber's extension number and identification number; and determine whether the identification number is valid upon a determination that there is an extension number for the another port; and changes the subscriber information upon a determination that the identification number is valid; and said tone generator generates a confirming tone and said subscriber circuit senses that the telephone is on-hook after changing the subscriber information.

* * * * *